United States Patent [19]

Ulisch et al.

[11] 3,868,299

[45] Feb. 25, 1975

[54] INSULATING GLASS UNIT CONTAINING ABSORBENT MIXTURE

[75] Inventors: Günter Ulisch, Leverkusen-Kueppersteg; Gerhard Heinze, Schildgen, both of Germany

[73] Assignee: Bayer Aktiengesellschaft, Leverkusen, Germany

[22] Filed: May 16, 1972

[21] Appl. No.: 253,757

Related U.S. Application Data

[62] Division of Ser. No. 65,709, Aug. 20, 1970, abandoned.

[30] Foreign Application Priority Data

Sept. 4, 1969 Germany............................ 1944912

[52] U.S. Cl................... 161/162, 161/45, 161/193, 52/172, 252/455
[51] Int. Cl............................................... B32b 5/18
[58] Field of Search ......... 161/162, 193, 45; 52/172

[56] References Cited
UNITED STATES PATENTS

| | | | |
|---|---|---|---|
| 2,887,806 | 5/1959 | Hassett ............................... | 161/162 |
| 2,949,689 | 8/1960 | Vida ................................... | 161/162 |
| 2,964,809 | 12/1960 | Gwyn et al............................. | 52/172 |
| 2,973,327 | 2/1961 | Mitchell et al....................... | 252/449 |
| 3,030,673 | 4/1962 | London................................ | 52/172 |
| 3,057,505 | 10/1962 | Chapman et al..................... | 220/2.1 |
| 3,238,123 | 3/1966 | Voorhies et al. .................. | 208/264 |
| 3,366,578 | 1/1968 | Michalko............................ | 252/455 |

Primary Examiner—George F. Lesmes
Assistant Examiner—William R. Dixon, Jr.
Attorney, Agent, or Firm—Burgess, Dinklage & Sprung

[57] ABSTRACT

An adsorbent intended in particular for use in multiplelayer insulating glass comprising by weight about 60 to 90 % of a narrow-pored zeolite having a pore width up to 5 Angstroms, about 10 to 30 % of a widepored adsorbent having a pore width in excess of 5 Angstroms and optionally up to about 20 of a binder.

3 Claims, No Drawings

INSULATING GLASS UNIT CONTAINING ABSORBENT MIXTURE

This is a division of application Ser. No. 65,709 filed Aug. 20, 1970, now abandoned.

This invention relates to an adsorbent with unique properties and to the use of this adsorbent for the simultaneous removal of water vapor and solvent vapors in particular from the gap between the layers of multiple-layer insulating glass, and to a process for producing the adsorbent.

In modern adsorption techniques, a distinction is drawn between on the one hand large-surface substances with non-uniform pores, i.e. with a spectrum of pore diameters, and on the other hand products all of whose pores are of substantially the same dimensions ranging only over a few Angstroms.

The first group includes a number of conventional adsorbents such as active carbons, silica gel and aluminum oxide. Apart from temperature and partial pressure, the extent to which these adsorbents can be used for selective adsorption is largely governed by the boiling points of the adsorbates and to a lesser extent by their properties, for example by their dipole moments, etc. By contrast, neither the diameter nor the configuration of the molecules has any real effect upon adsorption because pores of a variety of sizes are present.

The adsorbents of the second group behave differently. The most important representatives of this group are the crystalline zeolites which have pores of substantially uniform dimensions whose diameters are in the range from 3 to 10 Angstroms units depending both upon the crystal structure and upon the presence of particular cations. These zeolites are only able to adsorb molecules whose effective cross section is smaller than the diameter of the zeolite pores. The smaller molecules are separated from a mixture also containing relatively large molecules, and it is for this reason that as long ago as in 1926 McBain gave these zeolites the name of "molecular Sieves" (Kolloid Zeitschrift 40, (1926), 4). One of the molecular sieves commonly used in adsorption techniques for intensive drying is the synthetic zeolite, generally known as "sodium zeolite A", with a pore width of 4A. This zeolite is able to adsorb the small water molecules, whereas the molecules of most solvents are far too bulky to be adsorbed into the pore system of the zeolite crystals. Accordingly, zeolite A selectively adsorbs the water molecules from a mixture of water vapor and solvent vapors.

Examples of wide-pored zeolites include synthetic crystalline zeolites with the structure of the mineral faujasite which are frequently referred to as zeolite X and zeolite Y. The pores which in this case too are completely uniform have diameters of from about 8 to 10 A, depending upon cation occupation. Hereinafter, the synthetic faujasites are characterized according to their $SiO_2$ content, based on 1 mol of $Al_2O_3$; accordingly, a synthetic faujasite with an $SiO_2/Al_2O_3$ ratio of 3 is referred to as synthetic faujasite-3. By virtue of their larger pores, these zeolites are able to adsorb most solvent vapors in addition to water vapor. Accordingly, they do not show any selectivity either for water or for solvent vapors. In this respect, they behave similarly to the large-surface adsorbents of non-uniform pore size belonging to the first group described hereinabove, disregarding their behavior will respect to even larger more bulky molecules. Therefore, as the term "wide-pored adsorbents" is employed herein it is intended to embrace such faujasites as well as the large-surface adsorbents belonging to the first group, provided they have pores wider than 5 Angstroms and preferably wider than about 8 Angstroms.

It is accordingly an object of the present invention to provide an adsorbent composition for removing both water and solvent vapors.

A granulated adsorbent for the simultaneous absorption of water vapor and solvent vapors has now been found, comprising a homogeneous mixture of from about 10 to 30 % by weight of a wide-pored adsorbent, from about 60 to 90 % by weight of narrow-pored zeolites with a pore width of up to 5 Angstroms and optionally up to about 20 % by weight of a binder. Synthetic faujasites are preferably used as the wide-pored adsorbent and sodium zeolites A as the narrow-pored zeolites.

In addition to the synthetic faujasites with pore diameters of from about 8 to 10 Angstroms, active carbon, silica gel and aluminum oxide as well as mixtures thereof may also be used as the wide-pored adsorbents. Kaolin, attapulgite, bentonite and also waterglass and gellable silica sols as well as mixtures thereof are suitable for use as the binder.

In the process for producing the homogeneous adsorbents, a powdered narrow-pored zeolite with a pore width of up to 5 Angstroms, a wide-pored adsorbent and optionally at least one binder are simultaneously mixed together and granulated, and the resulting granules activated by heat treatment.

According to the invention, the powdered narrow-pored zeolites and wide-pored adsorbents can be mixed together with the necessary binders such as kaolin, attapulgite or bentonite in the absence of moisture, the resulting mixture converted with water into a homogeneous paste in a kneading machine and the resulting paste extruded into pellets. Because of the difficulty of obtaining completely homogeneous mixtures in reasonably short times by dry mixing or by mixing in paste form, however, it is of greater advantage initially to mix the components in a stirrable aqueous suspension, whereby a completely homogeneous distribution is readily and rapidly realizable. A water content of the level required for extrusion is then achieved by removing the excess water by filtration, optionally followed by partial drying.

However, it is of advantage to use processes in which liquid suspensions are employed from the outset for the purposes of granulation. According to German Patent Specification No. 1,165,562, a molecular sieve zeolite in the form of a powder can be stirred with an aqueous stable silica sol to form a free-flowing suspension, the suspension thus obtained being introduced into a liquid immiscible with water to form droplets of the required size following the addition of a gelating catalyst. The bead granulates formed as a result of sol-gel conversion are finally removed from the liquid. The process is suitable for example for the simultaneous shaping or forming of narrow-pored and wide-pored zeolites, or narrow-pored zeolite and ground silica gel, into completely homogeneous bead granulates.

The granulates according to the invention are particularly suitable for use in multiple-layer insulating glass. In cases where they are used for this purpose, the adsorbent has to maintain an extremely dry atmosphere in the gap between the layers in order to prevent coating of the layers through the condensation of water vapor in the event of extreme cooling. At the same time, solvent vapors, for example isopropyl alcohol or methyl ethyl ketone vapors emanating from the adhesives used to join the layers to the spacer frame, can be present in the intermediate-zone atmosphere. These vapors can also result in coating of the layers through cooling even in the complete absence of water.

Basically, water vapor is adsorbed to a far greater extent than solvent vapors by the adsorbents in question because of the high dipole moment of the $H_2O$ molecules. However, measurements have shown that both large-surface adsorbents and also the wide-pored zeolites still adsorb solvent vapors despite appreciable pre-adsorption of water, in other words concurrent adsorption of water and solvent molecules takes place at the active centers of these adsorbents. It is clear that, because of this concurrent adsorption, the residual $H_2O$ content in the spaces of zones involved cannot be reduced to such low values as in those cases where narrow-pored zeolites, for example zeolite A, are used, because, firstly, no active centers are blocked by solvent molecules and, secondly, because the adsorption capacity for water is higher at the minimal partial pressures in question. It can be seen from Table 1 which numerically reproduces the water isotherms of a few typical pure adsorbents at 25°C., that adsorption at low partial pressures is greatest in the case of the narrow-pored zeolite (zeolite A).

TABLE 1

$H_2O$ adsorption figures (in g. of $H_2O$/100 g. of the anhydrous pure adsorbent) at 25°C at equilibrium of different powdered absorbents

|  | $H_2O$ partial pressure | | | |
|---|---|---|---|---|
|  | 10 | 1 | 0.1 | 0.01 mm Hg. |
| Sodium zeolite A | 23.8 | 21.4 | 18.9 | 16.4 |
| Synthetic sodiumfaujasite-2.8 | 31.0 | 25.1 | 20.1 | 14.5 |
| Synthetic sodiumfaujasite-3.3 | 32.5 | 26.8 | 19.5 | 12.0 |
| Silica gel | 28.0 | 4.8 | 2.6 | 0.8 |

(ground, supplied by Gebr. Herrmann, Cologne-Ehrenfeld)

In some cases, these differences are even more noticeable when the capacity is based on the volume occupied by the adsorbent rather than on the weight used, which is necessary in most applications. The granulates of wide-pored zeolites have lower apparent densities than those of narrow-pored zeolites. Table 2 below shows the capacity based on volume, the usual binder-containing zeolite granulates (containing approximately 15 to 20 % of clay-binder) being used.

TABLE 2

$H_2O$-adsorption figures (in g. of $H_2O$/100 ml. of anhydrous granulate) at 25°C. at equilibrium of different granulated absorbents

|  | $H_2O$ partial pressure | | | |
|---|---|---|---|---|
|  | 10 | 1 | 0.1 | 0.01 mm.Hg. |
| Sodium zeolite A (apparent density 690 g/l) | 14.8 | 12.1 | 11.1 | 9.7 |
| Synthetic sodiumfaujasite-2.8 (apparent density 640 g/l) | 16.4 | 13.3 | 10.6 | 7.6 |
| Synthetic sodiumfaujasite-3.3 (apparent density 590 g/l) | 15.6 | 12.2 | 8.2 | 4.7 |
| Silica gel (apparent density 750 g/l) | 21.0 | 3.6 | 2.0 | 0.6 |

(ground, supplier Gebr. Herrmann, Cologne-Ehrenfeld)

A small quantity of water vapor present in the atmosphere is preferentially adsorbed by the narrow-pored zeolite in cases where both types of adsorbent are present. The adsorption capacity for water vapor at the minimal partial pressures in question can then be numerically derived primarily from the proportion of narrow-pored zeolite in the combined adsorbent and also from the adsorption figures set out in Tables 1 and 2.

Conversely, the wide-pored adsorbent is more suitable for the adsorption of solvent vapors. Accordingly, a combination affords advantages over the use of a single product in regard to the residues of both substances, water and solvent, left in the atmosphere. The common granulation of both products to form a homogeneous adsorbent in turn ensures that the required mixing ratio is maintained in each component quantity and throughout the adsorbent introduced.

The process according to the invention is illustrated by the following examples wherein all parts are by weight unless otherwise expressed.

EXAMPLE 1

Suspension I

To prepare a combined adsorbent from sodium zeolite A and silica gel, 3.47 kg. of powdered sodium zeolite A containing 30.9 % of water (= 2.40 kg. of anhydrous zeolite) were condensed into flakes on a roller press. The condensed zeolite was suspended together with 0.63 kg. of ground silica gel containing 4.7 % of water (= 0.60 kg. of anhydrous silica gel) in a mixture of 1,500 ml. of silica sol, 500 ml. of water and 20 ml. of 5-normal hydrochloric acid by means of an intensive mixer. The silica sol contained 30 % of $SiO_2$, had a density of 1.20 g/ml. and a specific surface of the $SiO_2$ particles according to BET (Brunauer, Emmet & Teller) of 200 m²/g. The completed suspension had a density of 1.515 g/ml. and a pH value of 8.0.

Suspension II 600 g. of finely divided magnesium oxide of the kind known commercially as "Extra light usta magnesia" as a gelating catalyst were suspended in 10 liters of water and the resulting suspension left for 1 hour to complete hydration.

When 20 ml. of suspension I were mixed with 3 ml. of suspension II, a liquid suspension was formed, suddenly solidifying into a gel after 17 seconds. Streams of 200 ml. per minute of suspension I and 30 ml. of suspension II were delivered continuously to a mixing vessel equipped with a high-speed stirrer and then flowed through a distributer into an organic liquid of density 1.48 consisting of o-dichlorobenzone and perchloroethylene in which the jets were broken up into droplets. On completion of the sol-gel conversion, the gel beads were removed from the organic liquid by means of a screen, dried and dehydrated in a hot air stream at 350°C. to activate the adsorbent. Approximately 68 % of the granulate consisted of sodium zeolite A, 17 % consisted of the silica gel used as such and 15 % consisted of silica gel additionally formed through gelation from the silica sol.

EXAMPLE 2

23.2 kg. of sodium zeolite A containing 22 % of water were condensed on a roller press into flakes and suspended with 4.5 kg. of synthetic sodium faujasite-3.2 containing 26 % of water, 12,150 ml. of the same silica sol as used in Example 1, 700 ml. of water and 70 ml. of 5-normal hydrochloric acid, to form a suspension with a density of 1.56 and a pH value of 9.5. With 2 ml. of the magnesium oxide suspension used in Example 1, 20 ml. of the suspension gave the liquid suspension which solidified into a gel after 25 seconds. Granulation into gel beads, drying and activation were carried out as in Example 1. The anhydrous granulate contained approximately 70 % of sodium zeolite A, 13 % of synthetic sodium faujasite-3.2 and 17 % of silica gel emanating from the silica sol.

EXAMPLE 3

37 kg. of sodium zeolite A powder was compressed into flakes as in Example 1. 6.6 kg. of synthetic sodium faujasite-3.2 containing 31.5 % of water was also compressed into flakes. The zeolites were mixed with 15,000 ml. of the silica sol used in Example 1 and 200 ml. of 5-normal hydrochloric acid to form a suspension with a density of 1.52 and a pH value of 8.5. Granulates were prepared as described in Example 1. Approximately 72 % of the anhydrous granulates consisted of sodium zeolite A, 13 % of synthetic sodium faujasite-3.2 and 15 % of silica gel emanating from the silica sol.

EXAMPLE 4 a. In order to determine the adsorption capacity for solvent vapor, the combined granulates prepared in accordance with Examples 1, 2 and 3 were compared with the granulate of pure sodium zeolite A containing 85 % of zeolite and 15 % of inactive silica gel emanating from silica sol as binder, and with a binder-free sodium zeolite A granulate.

To this end, samples each of 0.3 g. of the anhydrous granulates were exposed to flowing air which had been freed beforehand from traces of carbon dioxide and water vapor by treatment with potassium hydroxide followed by drying with molecular sieve zeolites. By saturating a component stream of the purified air in a wash bottle with thermostatically controlled methylethyl ketone and adding it to the main stream, a constant solvent vapor partial pressure of 1 Torr was maintained. Methylethyl ketone was chosen as the test substance because it is used in the insulating glass industry for joining the layers with the frame sealing materials which give off methylethyl ketone vapors over prolonged periods. The samples were weighed at intervals of 4 hours each. An almost constant weight was attained after 24 hours. The increase in weight in the individual samples was as follows:

| | |
|---|---|
| product according to Example 1 | 3.8% by weight |
| product according to Example 2 | 5.7% by weight |
| product according to Example 3 | 5.4% by weight |
| binder-containing zeolite A granulate | 2.7% by weight |
| binder-free zeolite A granulate | 1.4% by weight | b. The same substances as in Example 4(a) were precharged with 5 % of water by the action of moist air. The solvent vapor absorption capacity was then determined as in Example 4(a). The increases in weight, based on the product precharged with 5 % of water, were as follows:

| | |
|---|---|
| product according to Example 1 | 1.2% by weight |
| product according to Example 2 | 3.7% by weight |
| product according to Example 3 | 3.4% by weight |
| binder-free zeolite A granulate | 0.6% by weight |
| binder-containing zeolite A granulate | 0.8% by weight |

These figures demonstrate the superiority of the adsorbents according to the invention over the use of granulates of pure narrow-pore zeolites in regard to the adsorption of solvent vapors.

In cases where pure wide-pored adsorbents, for example silica gel, are used, even larger quantities of solvent were adsorbed although this is not absolutely necessary because of the limited supply of solvent vapor, and would even be of considerable disadvantage by necessitating the use of larger quantities of adsorbent in view of the reduced $H_2O$ capacity in the range of minimal partial pressures according to Tables 1 and 2.

Various changes and modifications may be made without departing from the spirit and scope of the present invention and it is intended that such obvious changes and modifications be embraced by the annexed claims.

What is claimed is:

1. In an insulating glass unit comprising two layers of glass, means spacing said layers from one another and forming an enclosed space therebetween, and vapor-adsorbing granules disposed in and filling only a portion of said space, the improvement which comprises employing as said granules so as simultaneously to adsorb vapors of water and solvent homogeneous granules comprising, by weight, at least about 60% of at least one narrow-pored zeolite having a pore width of up to 5 Angstroms, at least about 10% by weight of at least one wide-pored adsorbent having a pore width in excess of 5 Angstroms, and about 15 to 20% of at least one binder selected from the group consisting of kaolin, attapulgite, bentonite, waterglass and silica.

2. An insulating glass according to claim 1, wherein the narrow-pored zeolite comprises sodium zeolite A.

3. An insulating glass according to claim 1, wherein the wide-pored zeolite comprises silica gel, a synthetic faujasite having a pore width of about 8 to 10 Angstroms, or a mixture thereof.

* * * * *